(12) United States Patent
Herold

(10) Patent No.: US 8,844,354 B2
(45) Date of Patent: Sep. 30, 2014

(54) UNIVERSAL MEASURING CONTAINER AND METHOD

(71) Applicant: Jakob Herold, Herlev (DK)

(72) Inventor: Jakob Herold, Herlev (DK)

(73) Assignee: Silicone Zone (HK) Ltd., Kowloon Tong (HK)

( * ) Notice: Subject to any disclaimer, the term of this patent is extended or adjusted under 35 U.S.C. 154(b) by 0 days.

(21) Appl. No.: 13/655,850

(22) Filed: Oct. 19, 2012

(65) Prior Publication Data

US 2014/0109669 A1    Apr. 24, 2014

(30) Foreign Application Priority Data

May 15, 2012    (EP) .......................... 002041731-0001

(51) Int. Cl.
*G01F 19/00*    (2006.01)
(52) U.S. Cl.
USPC ........................................................ 73/426

(58) Field of Classification Search
CPC .... G01F 19/00; B65D 25/56; B65D 41/0414; B65D 47/0804
USPC ........................................................ 73/426
See application file for complete search history.

(56) References Cited

U.S. PATENT DOCUMENTS

| 6,769,302 | B1 * | 8/2004 | King et al. ...................... 73/427 |
| 7,306,120 | B2 * | 12/2007 | Hughes .......................... 222/158 |
| 2007/0068250 | A1 * | 3/2007 | Krent ............................. 73/427 |
| 2009/0255333 | A1 * | 10/2009 | Henry et al. ................... 73/427 |

* cited by examiner

*Primary Examiner* — Lisa Caputo
*Assistant Examiner* — Jamel Williams
(74) *Attorney, Agent, or Firm* — Gregor N Neff

(57) ABSTRACT

The measurement container has side wall segments forming corners. Each of several corners forms a separate pour-spout for fluent materials, and each has a separate measurement scale, preferably in different measurement units. Preferably, the corners are made of at least semi-transparent material so that the level of fluent material in the container is visible through the wall at each corner.

16 Claims, 2 Drawing Sheets

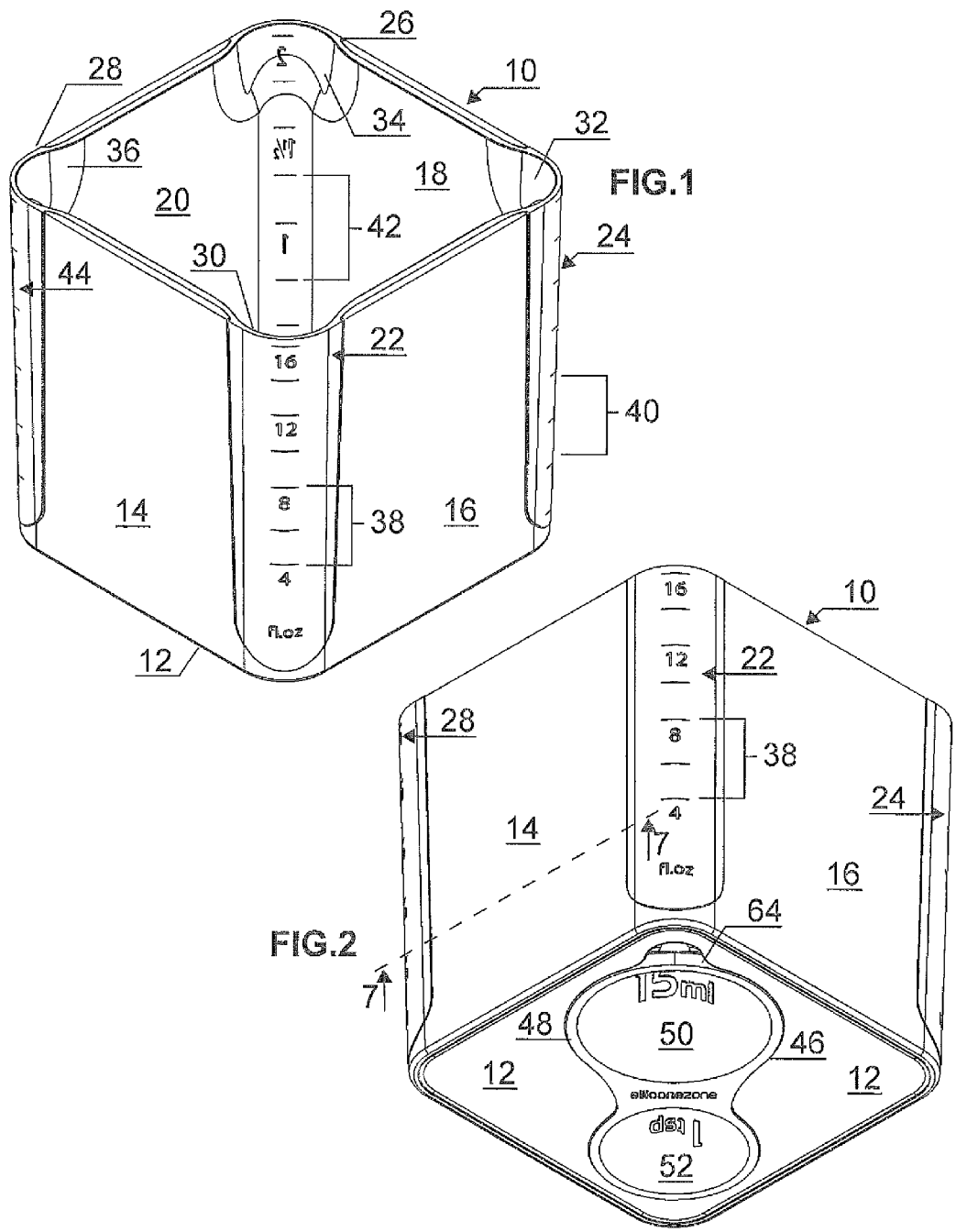

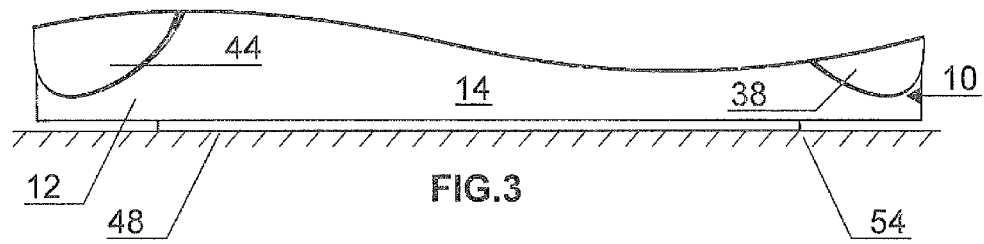
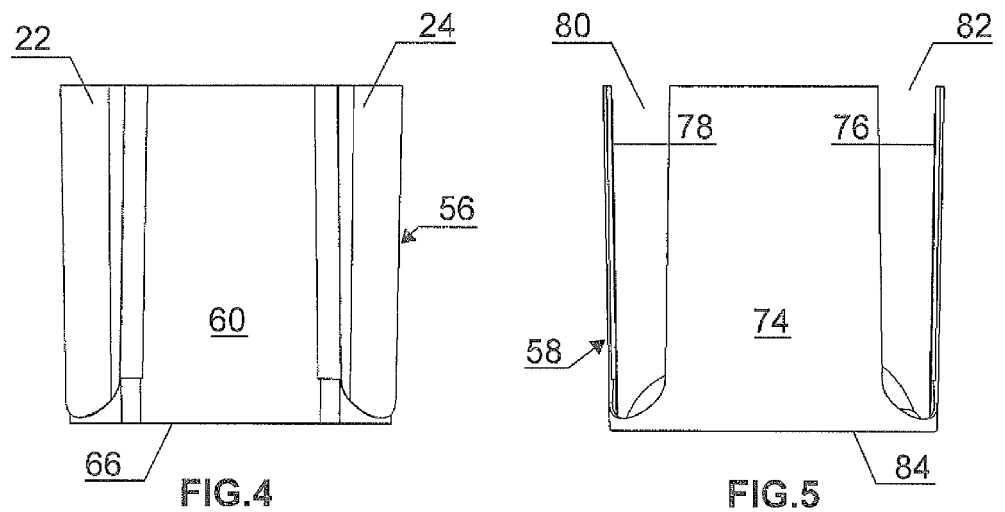
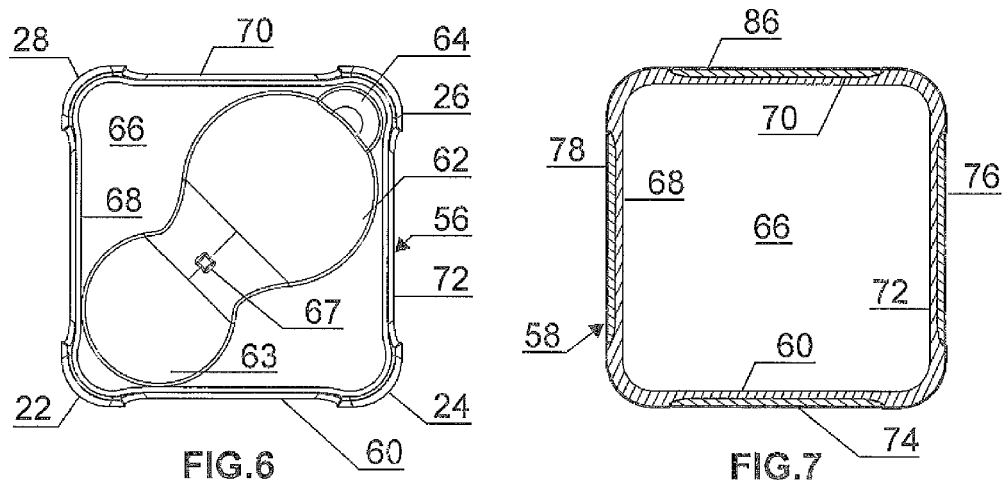

UNIVERSAL MEASURING CONTAINER AND METHOD

This invention relates to measuring containers and methods, and particularly to measuring containers and methods for measuring fluent materials, such as liquids, granular materials, such as sugar and salt, and powdered materials such as flour, etc. in the kitchen.

The use of different units of measure in many different countries and areas of the world continues to cause problems. Just some of the more widely used measurement units include the cup used in the U.S. and elsewhere; milliliter unit, used in Europe; and the fluid ounce and the pint, as used in the U.S. and many Commonwealth countries.

The manufacture and sale of measuring containers is complicated and made more expensive by the need to use selected measurement units appropriate to the country or area of the world in which sales are made.

It long has been desired to enable the use of diverse measurement units in connection with measuring containers, including measuring cups, spoons and scoops. Various approaches have been used in the past in an attempt to overcome such problems, but with marginal or only partially successful results.

In accordance with the foregoing, it is an object of this invention to provide a measuring container and method in which measurements can be made in a substantial number of different measurement units.

It also is an object of the invention to provide such a device and method in which the fluent materials being measured can be easily measured by the user of the device, by use of one of a plurality of different scales, and can easily pour the fluent materials out of the measuring container once the measurements have been made.

Another object of the invention is to provide an economical construction and method of use for such devices.

In accordance with the present invention, the foregoing objects are met by the provision of a measuring container with a bottom and a side wall structure comprised of side wall sections forming corners. Each of the corners is constructed so as to provide a clear channel for conducting fluid materials out of the measuring container, so that each corner can be used as a pour spout to pour the contents out of the container.

Preferably, a separate measuring scale is marked on the side wall adjacent to each of the corners so that measurements can be made adjacent to each of the pour spouts.

Preferably, each of the scales next to a corner of the container measures the quantity of fluid materials in the container according to a different unit of measure.

In a preferred embodiment of the invention, the container is a rectilinear parallelepiped, such as a cube, and has four side wall sections and four corners, with a set of measurement marks at each of the four corners.

A preferred construction for the container consists of an inner construct and an outer construct which are fitted together and secured to one another. The inner construct preferably is made of transparent material or semi-transparent material, and the outer construct has walls which embrace the walls of the inner construct and are secured thereto, leaving the transparent corners of the container free and visible to a person looking into the container.

In the method of use, the user selects one of the different scales of measurement, looks through the corner at which that measurement scale is located to determine the volume of fluent material in the container, and then uses any of multiple pour spouts for pouring the measured contents from the container.

Preferably the container has no handle protruding from any of the sides, so as to keep the side walls free of obstructions to allow the user to use his or her hands to grasp any pair of side walls without hindrance.

The foregoing and other advantages of the invention will be set forth in or apparent from the description and drawings.

IN THE DRAWINGS

FIG. 1 is a perspective view of a preferred measuring container constructed in accordance with the present invention;

FIG. 2 is a bottom perspective view of the measuring container shown in FIG. 1;

FIG. 3 is a broken-away, partially schematic view of the bottom surface of the container shown in FIGS. 1 and 2 when resting on a horizontal surface;

FIG. 4 is a front elevation view, and FIG. 6 is a top plan view of an inner construct used in manufacturing the container shown in FIGS. 1 and 2;

FIG. 5 is a front side elevation view of an outer construct used together with the inner construct shown in FIGS. 4 and 6 in fabricating the container of FIGS. 1 and 2; and FIG. 7 is a cross-sectional view taken along line 7-7 of FIG. 2.

GENERAL DESCRIPTION

FIGS. 1 and 2 show a measurement container 10 for measuring fluent materials, such as liquids, powders, granular materials, comminuted (chopped) or shredded materials, etc. particularly those materials commonly measured in the kitchen.

The container 10 has a bottom wall 12, four side wall sections 14, 16, 18 and 20, and four rounded corners 22, 24, 26, and 28.

Each of the four corners is marked with a separate set of scale markings 38, 40, 42, and 44. Preferably, each set is in a different unit of measure. The units of the scale 38 are in fluid ounces, and each of the other scales preferably is in a different set of units, such as milliliters, cups, pints, or other suitable measurement units.

Preferably, each of the corners is made of transparent or semi-transparent material so that the level of fluent material in the container can be seen through one of the four transparent corners and measured according to the units marked on that corner.

Each of the four corners of the container 10 has a beveled or outwardly splayed upper edge portion, 30, 32, 34 or 36. These edge portions are provided in order to facilitate pouring fluent material smoothly from each of the four corners. Preferably, the inside of the side wall at each of the four corners is smooth so that a smooth, outwardly flared channel is provided at each corner for pouring fluent materials from the container after having been measured.

Referring now particularly to FIG. 2, the bottom wall 12 of the container 10 is recessed and shaped to receive a two-unit measuring spoon 46 whose lower edge is shown at 48, with two measuring recesses or bowls 50 and 52. The measuring spoon 46 is dimensioned and shaped to form a frictional fit in the recess in the bottom wall 12, and easily can be removed for use as a measuring spoon with the assistance of a further recess 64 beside the spoon recess, to give access to a finger to use in removing the spoon.

As it is shown in FIG. 3, which is a broken-away side elevation view of the measuring container when resting on a horizontal surface 54, the lower edge 48 of the silicone rubber measuring spoon extends slightly below the lower surface of the bottom 12 of the container. Because it is made of material, such as silicone rubber, having a relatively high co-efficient of friction, the lower edge of the measuring spoon serves double-duty as a stabilizing foot for the measurement container to keep it from sliding or other unwanted movement during use.

One of the features of the invention is the advantageous construction of the side walls, and the method of manufacturing the device.

The four corners of the container 10 are made of semi-transparent or transparent material, as noted above. The side walls sections in between the corners preferably are made of opaque or substantially opaque materials, in order to provide visual contrast sufficient to properly guide the user's eye to locations of the measurement marks, and in order to provide visual interest. Thus, the corners and the wall sections between the corners have distinctly different visual characteristics.

MANUFACTURING METHOD

In accordance with another aspect of the present invention, the visually different areas of the container construction are formed by providing two molded constructs; an inner construct and an outer construct, and then nesting the constructs together and securing them to one another to form the final product.

Preferably, the inner construct is made of a first material having a first visual quality, and the second construct is made of a material having a different visual quality.

In accordance with this feature of the invention, FIG. 4 is a side elevation view of an inner construct 56. The inner construct 56 also is shown in a top plan view in FIG. 6.

The inner construct has a bottom wall 66, four vertical side walls 60, 68 70, and 72, and the four corners, 22, 24, 26 and 28. Three spoon recesses 62, 63, and 64 are formed in the bottom wall, with an injection molding passageway 67. The scales 38, 40, 42 and 44 are formed in the molding process.

As it is evident from FIG. 6, the four vertical side walls 68, 70, 72, and 60 are recessed slightly relative to the corners. This helps to better define the pour spout channels for the device, and provides recesses for receiving elements of the outer construct.

FIG. 5 shows an outer construct 58 which has four partial vertical walls segments 74, 76, 78 and 86 (also see FIG. 7) which span only the space between adjacent corners, and fit into the recesses shown in FIG. 6 when the two units 56 and 58 are nested together with the inner construct inside the outer construct. The walls of the two units then are secured together, such as by heat welding.

Preferably, the materials of which the two constructs are made have different visual characteristics. Preferably, the inner construct is molded from a transparent or semi-transparent hard plastic material such as polystyrene, or the like.

Preferably, the outer construct is molded from an opaque or semi-opaque material of the same plastic composition.

By this method, the two constructs are formed easily and at modest cost by molding, and then nesting the two constructs together, and then securing them to one another, such as by heat welding.

METHOD OF USE

In use, the user can select one of the different marking units and view the contents of the container through the corresponding corner as the container is being filled. Then the user can pour the contents out of the corner in which the measurements were made, or a different corner, if that is more convenient. This facilitates the quick and very easy measuring and pouring of fluent substances.

If the user needs a measuring spoon, the container 10 can be tilted to give access to the bottom, and the measuring spoon 46 can be removed and used quickly and easily in the measurement process. Thus, the measurement spoon provides both a supplemental measurement capability, as well as a stabilizing capability to minimize unwanted slippage of the container on the surface upon which it is resting.

It can be seen from the foregoing that the objectives set forth in the specification above are readily met by the present invention.

The above description of the invention is intended to be illustrative and not limiting. Various changes or modifications in the embodiments described may occur to those skilled in the art. These can be made without departing from the spirit or scope of the invention.

The invention claimed is:

1. A measuring device comprising
   a. a container for a fluent substance to be measured, said container comprising
   b. a side wall comprising a plurality of side wall sections joined together at a plurality of corners,
   c. a bottom wall joined to said side wall,
   d. a separate measurement scale adjacent each of said corners for measuring the volume of said substance in said container, each of said scales being visible to a user of said device,
   e. each of said corners forms a pour spout for pouring said substance out of said container, and each of said pour spouts provides a substantially unimpeded trough for carrying said fluent substance from adjacent said bottom wall to and over the top edge of said side wall when said container is tipped up to pour said substance through said trough.

2. A device as in claim 1 in which each of said side walls is unimpeded by any projection, to the extent that said container can be grasped in any of a plurality of positions suitable to pour said substance from a selected one of said spouts.

3. A device as in claim 1 in which each of a plurality of said measurement scales gives measurements in a different unit of measure.

4. A device as in claim 1 in which said container has the shape of a rectangular parallelepiped, and in which there are four of said corners, and four of said side wall sections, each of said side wall sections being graspable by one hand in any of four orientations to facilitate pouring said substance from any one of said four corners.

5. A device as in claim 1 in which each of said corners is rounded and the material of said side wall adjacent each of said corners is sufficiently transparent to make the substance level in said container visible from outside said container, each of said scales being positioned close enough to said corner to enable visual comparison of said level with said scale.

6. A device as in claim 5 in which each of said scales is formed on one of said rounded corners.

7. A device as in claim 5 in which the material of said side wall between adjacent ones of said corners is substantially opaque.

8. A device as in claim 1 in which the material at the top of said side wall at each corner is flared outwardly from the bottom portion of said corner to facilitate pouring said substance at a selected one of said corners.

9. A measuring device comprising
   a. a container for a fluent substance to be measured, said container comprising
   b. a side wall comprising a plurality of side wall sections joined together at a plurality of corners,
   c. a bottom wall joined to said side wall,
   d. a separate measurement scale adjacent each of said corners for measuring the volume of said substance in said container, each of said scales being visible to a user of said device,
   e. each of said corners forming a pour spout for pouring said substance out of said container, and
   f. said bottom wall having a recess, said recess extending into said container and being shaped to receive therein a friction-inducing foot member extending slightly from said bottom wall for deterring unwanted movement of said container when resting on a support surface.

10. A device as in claim 9 in which a volume measuring spoon or scoop made of high coefficient of friction material is said foot member, and said measuring spoon is releasably held in said recess to be removed for use in measuring.

11. A measuring device comprising
   a. a container for a fluent substance to be measured, said container comprising
   b. a side wall comprising a plurality of side wall sections joined together at a plurality of corners,
   c. a bottom wall joined to said side wall,
   d. the material of said side wall at each of said corners being at least semi-transparent to permit viewing the level of said substance in said container from outside thereof,
   e. a separate measuring scale adjacent each of said corners, each corner forming a pour spout,
   f. said side wall, corners and bottom wall comprising:
   g. an inner construct having an inner bottom wall layer and an inner side wall layer made of a single, at least semi-transparent material,
   h. an outer construction having an outer bottom wall layer and side wall layer segments dimensioned to at least partially envelope said inner side wall layer and made of a single substantially opaque material,
   i. said inner and outer constructs being fitted together with said outer side wall layer segments secured to said inner side wall layer between said corners, thereby leaving said corners exposed to view.

12. A device as in claim 11 in which said inner and outer bottom wall layers are indented and shaped to receive a friction foot structure.

13. A device as in claim 12 in which said friction foot structure comprises a measuring spoon releasably secured in the indentations in said bottom wall layers with an edge of said spoon extending below the lowest outer surface of said bottom wall.

14. A device as in claim 11, a separate measurement scale adjacent each of said corners for measuring the volume of said substance in said container, each of said scales being visible to a user of said device, each of said scales being formed in one of the corners of said inner construct, said side wall being beveled outwardly at the upper edge of each of said corners.

15. A device as in claim 11 in which said device has the shape of a cube with four corners and is grippable to pour from any of four corners.

16. A method of using a measurement container for fluent materials, comprising
   a. providing a measurement container comprising:
      1. a container for a fluent substance to be measured, said container comprising
      2. a side wall comprising a plurality of side wall sections joined together at a plurality of corners,
      3. a bottom wall joined to said side wall,
      4. a separate measurement scale adjacent each of said corners for measuring the volume of said substance in said container, each of said scales being visible to a user of said device,
      5. each of said corners forming a pour spout for pouring said substance out of said container,
      6. in which each of a plurality of said measurement scales gives measurements in a different unit of measure,
   b. measuring a fluent material in said container by selecting one of said plurality of different measurement scales and comparing the level of materials in said container with said scale, in which said side wall is at least semi-transparent at each of said corners, said comparing step comprising looking at said level of materials through said at least semi-transparent corner at one of said corners adjacent a selected one of said scales
   c. pouring said materials out of said container through any of said pour spouts.

\* \* \* \* \*